United States Patent [19]

Thuny et al.

[11] Patent Number: 5,968,420
[45] Date of Patent: Oct. 19, 1999

[54] ELECTRICALLY CONDUCTIVE FLUID OR SEMIFLUID MATERIAL

[75] Inventors: Gilles Thuny; Jean-Claude Sinigaglia, both of Marseille, France

[73] Assignee: Renaudin, France

[21] Appl. No.: 08/913,527

[22] PCT Filed: Mar. 2, 1995

[86] PCT No.: PCT/FR95/00254

§ 371 Date: Aug. 26, 1997

§ 102(e) Date: Aug. 26, 1997

[87] PCT Pub. No.: WO96/26984

PCT Pub. Date: Sep. 6, 1996

[51] Int. Cl.[6] .............................. H01B 1/20; H05B 1/00; B05D 5/12

[52] U.S. Cl. ................... 252/520.1; 252/518.1; 252/519.33; 252/521.3; 264/450; 219/209; 219/213; 427/58; 427/126.3; 392/407

[58] Field of Search ........................ 252/519.1, 519.33, 252/520.1, 521.3; 264/450; 219/209, 213; 392/407; 427/58, 126.3

[56] References Cited

U.S. PATENT DOCUMENTS 4,857,384  8/1989  Mio et al. ............................ 428/164
5,529,720  6/1996  Hayashi et al. ...................... 252/518
5,536,770  7/1996  Glausch et al. ...................... 524/410

FOREIGN PATENT DOCUMENTS

| 15934 | 9/1975 | Bulgaria . |
| 359569 | 3/1990 | European Pat. Off. . |
| 2593185 | 10/1986 | France . |
| 2149424 | 6/1990 | Japan . |
| 2184740 | 7/1987 | United Kingdom . |
| 9400851 | 1/1994 | WIPO . |

*Primary Examiner*—Mark Kopec
*Attorney, Agent, or Firm*—Bierman, Muserlian and Lucas

[57] ABSTRACT

The present invention relates to an electrically conductive fluid or semifluid material for covering a surface and suitable in particular for radiant heating. Said material contains, in characteristic manner, in a binder for surface covering: 20% to 80% by weight of conductive fillers constituted by a flaky inorganic medium coated by a powder based on a double oxide or on a mixture of double oxides; said double oxide(s) satisfying the formula $A_xB_{1-x}O_{\frac{1}{2}(5-x)}$, in which $0<x<1$, A is selected from Ge, Sn, Pb; and B is selected from As, Sb, and Bi. The present invention also provides the use of said conductive fillers for making such electrically conductive fluid or semifluid materials, and the use of said fluid or semifluid materials.

15 Claims, 1 Drawing Sheet

ELECTRICALLY CONDUCTIVE FLUID OR SEMIFLUID MATERIAL

The invention relates to a fluid or semifluid material for covering a surface, and containing a binder; said material being electrically conductive, and particularly suitable for radiant heating.

The technical field of the invention is that of surface-covering compositions, for example such as paints, varnishes, lacquers, thick coverings, rendering.

A main application of the invention is to obtain a substance for producing temperature differences. Such substances are used more particularly for applying to supports in order to obtain radiant panels for radiant heating, and electrical heating systems making use of resistance heating.

Bulgarian author's certificate BG 15934 discloses an electrically resistive material which is applied in the form of a paint or a paste on an insulating surface, such as on the walls of rooms and/or premises to be heated. The material is used for radiant heating and it comprises:
 black or gray graphite comprising 100 parts by weight;
 an inert filler material comprising 0 to 50 parts by weight;
 fireblack varnish, comprising 75 to 150 parts by weight; and
 coresiline, comprising 60 to 120 parts by weight.

That material has the advantage of enabling low temperature premises to be heated over very large heat exchange areas, thereby consuming less energy than traditional systems of the central heating type which start from a small overheated zone and make use of the air in the premises to carry heat.

That material suffers from the drawback of using gray or black graphite, and fireblack varnish as its binder. Heater elements made of gray or black graphite and fireblack varnish require mechanical treatment in order to acquire the necessary electrical parameters. Fireblack varnish has relatively low mechanical strength, crazes very quickly, and once destroyed, becomes unusable . . . .

Also known, from French patent application FR-A-2 593 185, filed Oct. 30, 1986, is an electrically resistive material for radiant heating and comprising amorphous graphite, vinyl polyacetate, denatured alcohol, and a diluant constituted by coresiline.

While having the advantage of presenting high mechanical strength, that material also suffers from drawbacks. For example, the measured resistance of the graphite-containing paint is high, which means that it can pass only a very low current, even when the voltage applied to the terminals of such a covering is about 50 volts.

Paints are also sold that contain a small percentage by weight (generally about 3%) of conductive fillers. Such fillers are incorporated in said paints for the purpose of improving application thereof, by making them electrostatic. Given the low level of filler that they contain, such paints are not electrically conductive.

An object of the present invention is to propose a fluid or semifluid material of the type described in the above BG and FR documents, while avoiding the drawbacks mentioned above and enabling the electrical resistance of the corresponding covering to be reduced so that the voltages that need to be applied to the terminals of such a covering are relatively low while obtaining sufficiently high current.

According to the invention, this object is achieved by the fact that the fluid or semifluid material contains, in a surface covering binder, 20% to 80% by weight of conductive filler constituted by a flaky inorganic medium coated in a powder based on a double oxide or on a mixture of double oxides, said double oxide(s) satisfying the following formula:

$$A_x B_{1-x} O_{\frac{1}{2}(5-x)}$$

in which:

$0 < x < 1$

A is selected from the following chemical elements in group IV A: Ge, Sn, Pb;

B is selected from the following chemical elements in group V A: As, Sb, Bi; and O represents oxygen.

The present invention thus provides an electrically conductive fluid or semifluid material for covering a surface and that is particularly suitable for radiant heating. The invention is mainly described with reference to such heating. Nevertheless, the person skilled in the art will readily understand on reading the following description that said fluid or semifluid material as presently claimed has other applications. In particular, it can be used for the following purposes:

for eliminating damp from a wall;
 for the insecticidal nature of the presence of an electric current on a surface;
 to maintain the temperature of certain liquids or foodstuffs within a receptacle; and
 merely as an electrical conductor (for example like an electric wire connected to a light source).

In characteristic manner, said material contains in a binder 20% to 80% by weight of specific fillers.

Said fillers must be present in sufficient quantity ($\geq 20\%$) for obtaining the expected result: the resulting material in which they are dispersed is electrically conductive. They must not be present in excess ($\leq 80\%$) since otherwise said material becomes too viscous and gives rise to difficulties, in particular for its application to a surface.

Said fillers are electrically conductive inorganic fillers. More precisely, they comprise a flaky inorganic medium coated in a powder based on a double oxide or on a mixture of double oxides satisfying the following formula:

$$A_x B_{1-x} O_{\frac{1}{2}(5-x)}$$

in which A, B, O and x are as defined above.

x cannot be equal to 0 since compounds having the formula $B_2O_5$ are too conductive, without sufficient resistance and therefore do not release enough energy by the Joule effect to be useful in the meaning of the invention. Nor can x be equal to 1 since compounds having the formula $AO_2$ are not electrically conductive.

It is recalled at this point that A is selected from the following chemical elements in group IV A of the (Mendeleev) periodic table of chemical elements: Ge, Sn, Pb; while B is selected from the following chemical elements of group VA of said periodic table: As, Sb, Bi.

The flaky inorganic medium for the specific fillers used in the material of the invention can thus be coated in a powder based on one of the following double oxides:

$Ge_x As_{1-x} O_{1/2(5-x)}$
$Ge_x Sb_{1-x} O_{1/2(5-x)}$
$Ge_x Bi_{1-x} O_{1/2(5-x)}$
$Sn_x As_{1-x} O_{1/2(5-x)}$
$Sn_x Sb_{1-x} O_{1/2(5-x)}$
$Sn_x Bi_{1-x} O_{1/2(5-x)}$
$Pb_x As_{1-x} O_{1/2(5-x)}$
$Pb_x Sb_{1-x} O_{1/2(5-x)}$
$Pb_x Bi_{1-x} O_{1/2(5-x)}$ ($1 < x < 1$) or based on a mixture of said double oxides.

Advantageously, in the above formulae:

$$0.15 \leq x \leq 0.85$$

i.e. the ratio A/B advantageously lies in the range 15/85 to 85/15.

Advantageously, the following double oxide is used: $Sn_xSb_{1-x}O_{1/2(5-x)}$, $0 < x < 1$ with preferably: $0.15 \leq x 0.85$.

Said coating powder may optionally contain, in addition to the above-specified double oxides, at least one non-conductive oxide selected in particular from silica ($SiO_2$) and titanium dioxide ($TiO_2$). The use of such oxides (on their own or in a mixture) makes it possible firstly to increase the size of the conductive fillers and secondly to reduce the electrical resistance of the fluid material containing them. Naturally they are used in limited quantity. The non-conductive oxides cannot constitute more than 25% by weight of the coating.

The conductive double oxides, whether mixed or not with at least one non-conductive oxide, coat a flaky inorganic medium. Such a medium may consist, in particular, of natural phyllosilicate particles or of particles of material having a graphite structure.

In particular, it is possible to use particles of talc (of formula $Mg_3Si_4O_{10}(OH)_2$), of micas (phlogopite micate of formula $KMg_3AlSi_3O_{10}(OH)_2$, paragonite mica of formula $NaAl_2Si_3AlO_{10}(OH)_2$, musovite mica of formula $KAl_2Si_3AlO_{10}(OH)_2$), of pyrophyllite (of formula $Al_2Si_4O_{10}(OH)_2$), or of carbon, or of boron nitride (BN).

In a preferred variant of the invention, the claimed material contains conductive fillers that consist in particles of talc or mica coated in a powder based on a double oxide having the formula $Sn_xSb_{1-x}O_{1/2(5-x)}$, $0 < x < 1$ and preferably $0.15 \leq x \leq 0.85$.

It is specified here that the inorganic core of said conductive fillers represents about 30% to 70% by weight. In general, the conductive fillers which are contained in the fluid or semifluid material of the invention are of small dimensions. In particular, it is appropriate for the material to be stable and to have viscosity that is compatible with its use. Thus, said fillers generally have a diameter less than or equal to 15 $\mu$m.

To obtain said fillers, conventional methods are used. In particular, they can be prepared:

by spraying: a solution of oxides containing the particles of inorganic medium is injected into a flow of hot air; or by crystallization: a solution of oxides containing the particles of inorganic medium is cooled down to crystallization; the crystals are then ground up.

To prepare the fluid or semifluid material of the invention, said fillers are merely incorporated in the binder. Said fillers are dispersed within said binder. Dispersion comprises blending at a very low shear rate. During blending, it is important to avoid separating the powder (the coating) from the medium of the conductive fillers.

The binder used is a conventional binder of the type used in prior art paints, varnishes, lacquers, thicker coverings, . . . .

Advantageously, a varnish of the Pliolite type is used (based on styrene-butadiene copolymers), a film-generating varnish, that is soluble in non-aromatic solvents and has little odor. Numerous other binders, based on polymers in an aqueous phase or in a solvent can be used, and in particular solvent acrylics, chlorinated or cyclized rubber, and any type of vinyl, acrylic, styrene-acrylic . . . emulsion. In particular, in the invention, it is possible to use the conductive fillers in an odor-free paint in aqueous phase (latex).

The solvents used in making up said binder are conventional (water, aliphatic solvents, . . . ).

It is also mentioned that said binder may contain conventional additives such as, in particular, anti-sedimentation or anti-settling agents, thickening agents, wetting agents, . . . . Such additives are familiar to the person skilled in the art. Fluid or semifluid materials of the invention can thus contain additives sold under the trademarks BENTONE® and PUFF-IT® respectively as anti-settling agent and as thickening agent, and also soya lecithin, as a wetting agent.

Said electrically-conductive fluid or semifluid materials of the invention present a certain number of advantages. They make it possible in particular to obtain resistance that is suitable for working at low amperage while applying a voltage to terminals in the range 12 V to 220 V. They are particularly advantageous in that they can operate at low voltages (12 V to 24 V).

They are equally applicable to large areas and to small areas, thus making it possible to provide room heating that is uniform and agreeable. They can be applied to various electrically inert (insulating) substrates such as concrete, slabs of marble, . . . merely by being applied with a paintbrush, a paint gun, a flat brush, a spatula, or a coating machine, like an ordinary paint.

In addition, it is possible to obtain the desired electrical power (temperature) by varying the width and the length of the area covered by the material of the invention. To control said power, two parameters are available: the area covered and the voltage at the terminals.

In its first aspect, the invention thus provides the above-described electrically conductive fluid or semifluid material. In characteristic manner, said material contains the above-described conductive fillers. The use of said fillers for making said material constitutes the second aspect of the invention.

Even if some of said fillers have already been used in the prior art, they have never been used in sufficient quantity to generate materials that are conductive.

In its third aspect, the invention provides a method of using the above-described electrically conductive fluid or semifluid material. The method comprises the following steps:

putting at least two voltage-applying means on a substrate, the means being of length l and spaced apart by a distance d, said parameters l and d being selected as a function of the intended power; and applying a layer of said fluid or semifluid material between said voltage-applying means such that said layer conducts electricity when voltage is applied thereto.

In conventional manner, the voltage-applying means used are elongate conductor elements, such as adhesive strips containing copper, silver, aluminum, . . . or metal bars (e.g. copper bars). To apply voltage, said means are connected to a power outlet via an isolating transformer. Advantageously, a room temperature thermostat and a differential switch are included in the electrical circuit between said transformer and said means.

The electrically conductive layer may be applied in various shapes. It may be applied in elongate shape, e.g. along a sinuous line or in the form of a frame, thereby substantially reproducing a conductor wire, or it may be applied uniformly, so as to cover a large area.

In any event, the material is applied between said voltage-applying means.

Naturally it is applied on a substrate that is not conductive. It may therefore be necessary to treat the substrate beforehand to make it insulating.

Finally, the method of the invention does not exclude in any way covering the layer of electrically conducive fluid or semifluid material with a layer of conventional paint or covering referred to as a "finishing" layer.

The invention will be better understood and other characteristics and advantages thereof will appear on reading the following description of methods of use given by way of example.

Reference is made to the accompanying drawing, in which.

Figure 1:
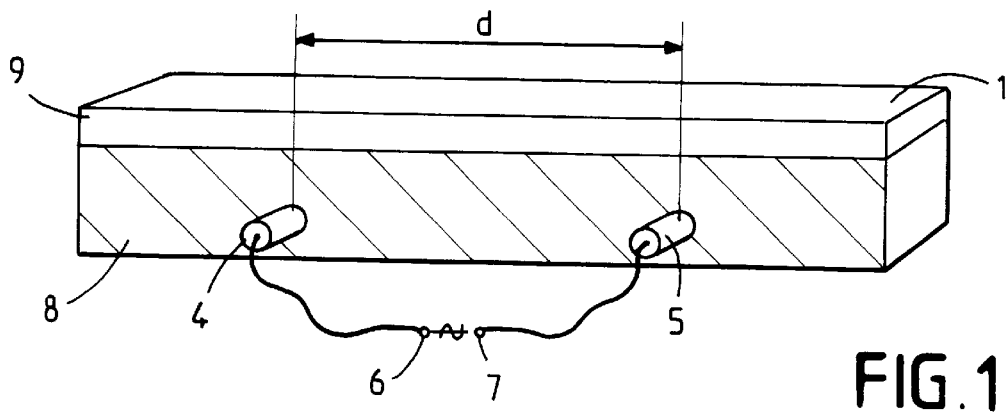
FIG. 1 is a perspective view of an experimental implementation of the method of the invention.

Reference is made initially to FIG. 1: the substrate 1, e.g. laminated wood, is shown therein covered in a layer of insulating primary paint 9 that is applied beforehand, and containing radiant particles for reflecting heat outwards (from the conductive fillers in the meaning of the invention).

Two voltage-applying means 4 and 5, themselves connected to terminals 6 and 7 between which a variable potential difference is applied, are placed on the substrate 1, and more precisely on the insulating layer 9, and they are spaced apart by a variable distance d.

The voltage-applying means 4 and 5 are copper bars extending transversely to the layer of electrically conductive material 8.

Figure 2:
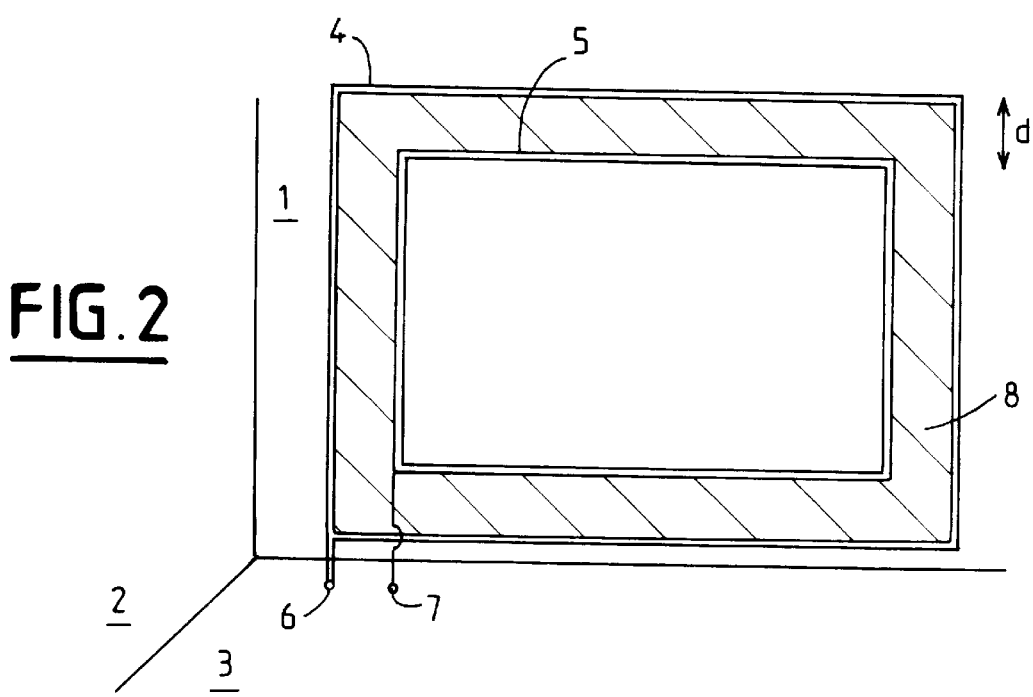
FIG. 2 is a fragmentary perspective view showing a first implementation of the method of the invention in a room.

With reference to FIG. 2, the room shown therein has two walls 1 and 2 and a floor 3. Compared with the embodiment of FIG. 1, it should be observed that the electrically conductive 8 is applied in an elongate shape, more particularly in the shape of a frame. The voltage applying means 4 and 5 are constituted by copper bars, advantageously conductive cords, which outline the layer of conductive material 8 of the invention.

Alternatively, the electrically conducive layer 8 may be applied in a sinuous line so as to reproduce conventional type electrical resistances, e.g. disposed in a zigzag.

Preferably, a decorative finishing layer containing radiant particles is applied so as to mask the set of conductor elements.

Figure 3:
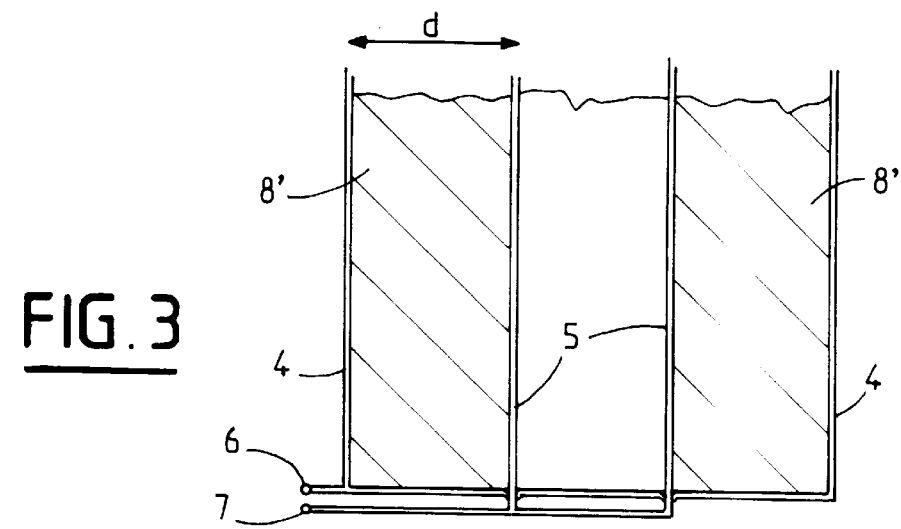
FIG. 3 is a fragmentary elevation view showing a second implementation of the method on a panel.

With reference finally to FIG. 3, the panel shown therein has two electrically conductive layers 8' applied in uniform manner, so as to cover two respective extensive areas between two pairs of voltage-applying means 4, 5, the voltage-applying means alternating and being connected in parallel.

This disposition makes it possible to increase the temperature obtained in the room.

The three embodiments described above with reference to the accompanying figures make it possible to adjust the temperature obtained by varying the voltage across the terminals of an AC source, for example.

Finally, the first aspect of the invention is illustrated by the following example.

Electrically-conductive fluid materials have been prepared with the following ingredients.

Binder: a varnish (V) containing:
  50 parts by weight of PLIOWAY® EC1 (vinyl-acrylic-thermoplastic terpolymer); and
  300 parts by weight of white spirit (aliphatic solvent containing at least 5% by weight aromatics).

Conductive fillers (C. F.): commercially available substances were used and more precisely particles sold by Merck under the trademarks MINATEC® 30 CM and MINATEC® 31 CM. The characteristics of these fillers are given below.

For the purposes of the invention, it is also possible to use particles sold by Du Pont de Nemours under the trademark ZELEC®. Such particles comprise mica platelets having a conducting layer of antimony-containing tin oxide.

MINATEC® 31 CM comprises mica particles coated by tin and antimony double oxide satisfying the formula $Sn_{0.85}Sb_{0.15}O_{2.075}$. The mica constitutes about 59% by weight of said particles, and the double oxide about 41% by weight. Said particles are opaque, with resistivity less than 100 $\Omega$.cm, and of size smaller than 15 $\mu$m. Their density is about 3.6 g/cm$^3$.

MINATEC® 30 CM: comprises mica particles coated by a mixture of the double oxide $Sn_{0.85}Sb_{0.15}O_{2.075}$, silica ($SiO_2$) and titanium dioxide ($TiO_2$). The mica constitutes about 41% by weight of said particles, the double oxide about 43% by weight, the silica about 4% by weight, and the titanium dioxide 12% by weight. Said particles are transparent, having a resistivity of less than 150 $\Omega$.cm, and a size of less than 15 $\mu$m. They have a density of about 3.6 g/cm$^3$.

Additives:
Anti-settling agent: BENTONE® SD 1 sold by Societe Industrielle du Titane.
Thickening agent: PUFF-IT sold by Carbonel Jacquemot.
Wetting agent: soya lecithin sold by Lambert Rivière.

The said ingredients were mixed to obtain an electrically conductive fluid material of the invention having the composition and characteristics given below:

|  | % by weight | Dry extract by weight (g) | Specific gravity | Dry volume (cm$^3$) |
|---|---|---|---|---|
| Varnish (V) | 48.65 | 7.75 | 1.03 | 7.52 |
| Conductive fillers (C.F.) | 49.36 | 47.35 | 3.6 | 13.25 |
| BENTONE ® SD1 | 1 | 0.98 | 1.6 | 0.61 |
| PUFF-IT | 0.6 | — | — | — |
| Lecithin | 0.4 | — | — | — |

Said material thus has the following technical characteristics:

dry extract by weight 56.08 dry extract by volume 26.81.

With a liter of said material, it is possible to cover about 3 m$^2$ in a moist layer having a thickness of 200 $\mu$m.

The following results were obtained with a conductive layer of area S deposited on a substrate of melamine resin-coated wood (see FIG. 1). A variable potential difference (U) was applied to two terminals of adhesive metal tape spaced apart by a variable distance (d) and kept in contact with said conductive layer.

| S (cm$^2$) / d (cm) | TE* | TF** | I(A) | U(V) | R($\Omega$) | P(W) | P per m$^2$ (w) |
|---|---|---|---|---|---|---|---|
| 50/10 | 11.6 | >100 | 0.110 | 206 | 3100 | 22.6 | 4532 |
| 75/15 | 11.9 | 60 | 0.110 | 204 | 3950 | 22.4 | 2992 |
| 100/20 | 12.3 | 42 | 0.100 | 205 | 4610 | 20.5 | 2050 |
| 125/25 | 12.4 | 40 | 0.100 | 204 | 4700 | 20.4 | 1632 |

-continued

| $\frac{S\,(cm^2)}{d\,(cm)}$ | TE* | TF** | I(A) | U(V) | R(Ω) | P(W) | P per m² (w) |
|---|---|---|---|---|---|---|---|

*TE: ambient temperature
** TF: layer temperature.

We claim:

1. A heat radiating electrically conductive fluid or semi-fluid surface covering material comprising:
    a surface-covering binder, and 20% to 80% by weight of conductive filler, said conductive filler being a flaky inorganic medium coated in a powder, said powder comprising a double oxide or a mixture of double oxides, said double oxide(s) satisfying the following formula:

$$A_xB_{1-x}O_{\frac{5-x}{2}}$$

in which:
    $0<x<1$;
    A is selected from the following chemical elements in group IV A: Ge, Sn, Pb;
    B is selected from the following chemical elements in group V A: As, Sb, Bi; and
    O represents oxygen.

2. A fluid or semifluid material according to claim 1, in which said conductive filler has a particle size less than or equal to 15 μm.

3. A fluid or semifluid material according to claim 1, in which said flaky inorganic medium is natural phyllosilicate particles or particles of a material of graphite structure.

4. The fluid or semifluid material according to claim 3, in which said natural phyllosilicate particles are selected from the group consisting of talc, pholopite, paragonite or muscovite micas and pyrophyllite particles.

5. The fluid or semifluid material according to claim 3, in which said material of graphite structure is selected from the group consisting of carbon and boron nitride.

6. A fluid or semifluid material according to claim 1, in which said coating powder contains only one double oxide, or a mixture of double oxides, or further contains at least one non-conductive oxide selected from silica and titanium dioxide.

7. A fluid or semifluid material according to claim 1, in which the formula for the double oxide(s) is: $0.15 \leq x \leq 0.85$.

8. A fluid or semifluid material according to claim 1, in which said flaky inorganic medium is particles of talc or mica and the double oxide has the formula:

$$Sn_xSb_{1-x}O_{\frac{5-x}{2}}$$

9. A method of radiant heating comprising the following steps:

placing at least two voltage-applying means on an insulating substrate, the voltage-applying means being of length l and spaced apart by a distance d, said parameters l and d being selected as a function of the intended power; and applying a layer of said fluid or semifluid material according to claim 1 between said voltage-applying means in such a manner that said layer gives off heat by conducting electricity when voltage is applied thereto.

10. A method according to claim 9, in which said layer being applied is applied in an elongate shape, so as to substantially reproduce a conductive wire, or in uniform manner so as to cover an extended area.

11. A process according to claim 10, in which said layer is applied in the form of a sinuous line or in the form of a frame.

12. A method according to claim 9, in which said voltage-applying means is elongate conductive elements or metal bars.

13. A process according to claim 12, in which said elongate conductive elements are adhesive tapes containing copper, silver, and aluminum.

14. A method according to claim 9, further comprising a prior step of applying an insulating layer on said substrate.

15. A heat-emitting coating resulting from applying and drying on an insulating substrate an electrically conductive fluid or semifluid material according to claim 1.

* * * * *